(12) United States Patent
Pan et al.

(10) Patent No.: US 12,020,085 B2
(45) Date of Patent: *Jun. 25, 2024

(54) QUALITY OF SERVICE SCHEDULING WITH WORKLOAD PROFILES

(71) Applicant: VMware, Inc., Palo Alto, CA (US)

(72) Inventors: Zhelong Pan, Cupertino, CA (US); Matthew Kim, San Jose, CA (US); Varun S. Lingaraju, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 17/385,075

(22) Filed: Jul. 26, 2021

(65) Prior Publication Data

US 2021/0357269 A1    Nov. 18, 2021

Related U.S. Application Data

(63) Continuation of application No. 16/511,872, filed on Jul. 15, 2019, now Pat. No. 11,074,111.

(51) Int. Cl.
*G06F 9/50*   (2006.01)
*G06F 9/455*   (2018.01)

(52) U.S. Cl.
CPC ........ *G06F 9/5088* (2013.01); *G06F 9/45533* (2013.01); *G06F 9/505* (2013.01); *G06F 9/5077* (2013.01); *G06F 2009/4557* (2013.01)

(58) Field of Classification Search
CPC .... G06F 9/5088; G06F 9/45533; G06F 9/505; G06F 9/5077; G06F 2009/4557
See application file for complete search history.

(56) References Cited

U.S. PATENT DOCUMENTS

| | | | |
|---|---|---|---|
| 8,095,929 | B1 | 1/2012 | Ji |
| 9,923,785 | B1 | 3/2018 | Li |
| 10,579,403 | B2 | 3/2020 | Antony |
| 2010/0169253 | A1* | 7/2010 | Tan ........................ G06F 9/5088 706/21 |
| 2016/0077859 | A1* | 3/2016 | Cropper ................ G06F 9/4418 718/1 |

(Continued)

FOREIGN PATENT DOCUMENTS

CN    107851106    3/2018

*Primary Examiner* — Jacob D Dascomb
(74) *Attorney, Agent, or Firm* — King Intellectual Asset Management

(57) ABSTRACT

Examples described herein include systems and methods for prioritizing workloads, such as virtual machines, to enforce quality of service ("QoS") requirements. An administrator can assign profiles to workloads, the profiles representing different QoS categories. The profiles can extend scheduling primitives that can determine how a distributed resource scheduler ("DRS") acts on workloads during various workflows. The scheduling primitives can be used to prioritize workload placement, determine whether to migrate a workload during load balancing, and determine an action to take during host maintenance. The DRS can also use the profile to determine which resources at the host to allocate to the workload, distributing higher portions to workloads with higher QoS profiles. Further, the DRS can factor in the profiles in determining total workload demand, leading to more efficient scaling of the cluster.

19 Claims, 6 Drawing Sheets

(56) References Cited

U.S. PATENT DOCUMENTS

| | | | |
|---|---|---|---|
| 2017/0090988 A1* | 3/2017 | Young | G06F 9/5094 |
| 2017/0269967 A1* | 9/2017 | Steffen | G06F 9/4893 |
| 2018/0101214 A1* | 4/2018 | Mahindru | G06F 9/5094 |
| 2019/0179659 A1 | 6/2019 | Herbert | |
| 2020/0319935 A1* | 10/2020 | Srivastava | G06F 9/5011 |
| 2021/0256066 A1 | 8/2021 | Srinivasan | |

* cited by examiner

QUALITY OF SERVICE SCHEDULING WITH WORKLOAD PROFILES

This application claims priority to and is a continuation of U.S. patent application Ser. No. 16/511,872, titled "QUALITY OF SERVICE SCHEDULING WITH WORKLOAD PROFILES," filed Jul. 15, 2019, which is incorporated in its entirety by reference for all purposes.

BACKGROUND

In a software-defined data center ("SDDC"), a distributed resource scheduler ("DRS") typically balances loads of hosts in a cluster by migrating workloads between the hosts. A workload, such as a virtual machine ("VM"), can require certain resources at a host, which the DRS can reserve through reservation, limit, and share settings. The DRS makes scheduling decisions based on cost-benefit analysis, such as which workloads can be moved to free-up space. The DRS also employs affinity or anti-affinity rules, to determine which workloads must and must not be placed on the same host together.

However, the DRS does not prioritize between workloads when it comes to quality of service ("QoS"). Instead, all workloads are treated the same within the context of the existing cost-benefit analysis and affinity decisions. When a host goes into maintenance mode, for example, the DRS does not determine evacuation priority or specialized workload treatment based on QoS. In a load balancing situation, the DRS does not discriminate between VMs that get moved to a new host other than through the affinity and load analyses described above. Similarly, when initially placing VMs on a host, the VMs are not prioritized based on QoS.

As a result, current resource scheduling decisions can negatively impact customer business processes. For example, in a Telco cloud, voice over IP ("VoIP") applications running on a virtual infrastructure can be very sensitive to network latency. Moving or pausing a VM for load balancing can cause an emergency call to be dropped abruptly. Customers do not want VMs for critical processes to migrate the same as other workloads, yet do not have any way of enforcing QoS at the scheduler level.

Additionally, the DRS typically performs capacity planning for a cluster based on workload demands, regardless of their importance or priorities. As a result, all workloads are usually calculated as having a demand of the average demand plus some order of standard deviation. This means the same capacity management is applied for all kinds of workloads, even those that are not critical and could be suspended if needed. As a result, the DRS tends to aggressively recommend scaling out and conservatively recommend scaling in. This can waste both computing resources and money, both of which are important to customers.

Consequently, a need exists for systems and methods that perform QoS-based scheduling using workload profiles.

SUMMARY

Examples described herein include systems and methods for enforcing QoS scheduling on workloads by using profiles. The method can include assigning different profiles to different workloads, with the profiles defining different QoS categories and having different scheduling primitives. A primitive can be an attribute or variable used in a DRS workflow to decide how to act with respect to a workload. In one example, a management console with a graphical user interface ("GUI") allows an administrative user to select a profile to assign to one or more workloads. A tag identifying the profile can be attached to the workload. The profile can include scheduling primitives that are used by a DRS (dynamic resource scheduler) for managing the workload. The DRS can make various decisions regarding placing and moving workloads, including reserving resources for the workloads. These decisions now can enforce QoS based on considering the scheduling primitives of the profiles. For example, the DRS can read the tag of a workload and retrieve scheduling primitives relevant to specific workflows of the DRS, such as initial workload placement, load balancing, and host maintenance mode.

In one example, the DRS can prioritize placement of the workload at a host relative to a second workload based the profile. For example, the DRS can use the tag to retrieve a placement prioritization primitive. This primitive can have a value indicating a rank or priority that the DRS can use to prioritize the workload relative to other workloads, which similarly can also have ranks or priorities. If a profile does not have a priority placement primitive, a default priority can be assigned to the corresponding workload.

In one example, the DRS can reserve resources for the workload at the host based on the profile. For example, the profile can include one or more resource reservation primitives. A first resource reservation primitive can specify a relative amount of computer processing unit ("CPU") resources to reserve, and a second resource reservation primitive can specify a relative amount of memory to reserve. These amounts can be relative to amounts specified in configuration information of the workload. For example, the primitives can specify reserving more than, the same as, or less than the resources specified in configuration information of the workload. A higher QoS workload can be assigned a profile with a resource reservation primitive that schedules more resources than normal. The profiles can be categorized by QoS in one example, with a first profile reserving more processing resources than a second profile, and the second profile reserving more processing resources than a third profile.

In one example, the DRS can take an action on the workload based on at least one of the scheduling primitives during load balancing or based on a maintenance mode at the host. Taking the action during the load balancing at the host can include leaving the workload running at the host. The DRS can ignore normal migration rules for the workload based on a scheduling primitive that disables migrating the workload during load balancing. Instead, the DRS can move another workload to a second host, the other workload not having the same primitive. Other primitives can be used for taking action during the maintenance mode. For example, an evacuation mode scheduling primitive of the profile can specify what the DRS should do with the workload while maintenance occurs at the host.

The DRS can also use the profiles in determining when to scale-out or scale-in a cluster, such as part of elastic dynamic resource allocation. To do this, the DRS can calculate a total demand based on the individual demands of multiple workloads in a cluster. To determine the individual demands, the DRS can use the profiles. For example, the DRS can overestimate the demand of a workload having a profile with a higher quality of service classification than another profile. Whereas prior systems sometimes overestimate all workload demands, normal workloads can have demands calculated at or below the levels in the configuration information. This can allow the DRS to scale out less aggressively and scale in more aggressively, saving resources and costs.

For example, the DRS can determine whether to scale the cluster based on the total demand and cluster capacity. This can include creating a ratio based on the total demand versus cluster capacity and comparing that ratio to one or more thresholds that indicate a need to scale the cluster one way or the other. Then, the DRS can recommend scaling when the thresholds are exceeded. An orchestrator process or other management process in the SDDC can receive the recommendation and scale the cluster. Scaling out can include adding one or more hosts, while scaling in can include removing one or more hosts.

The method can be performed as part of a system to backup and restore an SDDC, in an example. This can include executing, by a processor, instructions in a non-transitory, computer-readable medium to carry out the various stages.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts. Certain words that are used in this disclosure can have various equivalencies and are not intended to be limiting or exclusionary.

Examples described herein include systems and methods for QoS-aware resource scheduling in an SDDC, such as in a Telco cloud environment. To allow a DRS to make QoS-based scheduling decisions, an administrator can assign profiles to workloads. The workloads can include tags that identify the assigned profiles. The profiles can include scheduling primitives that differ based on the QoS category (or level) of the profile. In one example, the tag maps to a profile, which maps to scheduling primitives. Alternatively, the tag maps to various scheduling primitives that together represent a profile. Based on the profile and the associated scheduling primitives, the DRS can treat the workloads differently when performing initial workload placement, responding to host maintenance, or performing load balancing. An elastic DRS ("EDRS") component of the DRS can also reserve different levels of resources for workloads based on the QoS profiles.

Figure 1:
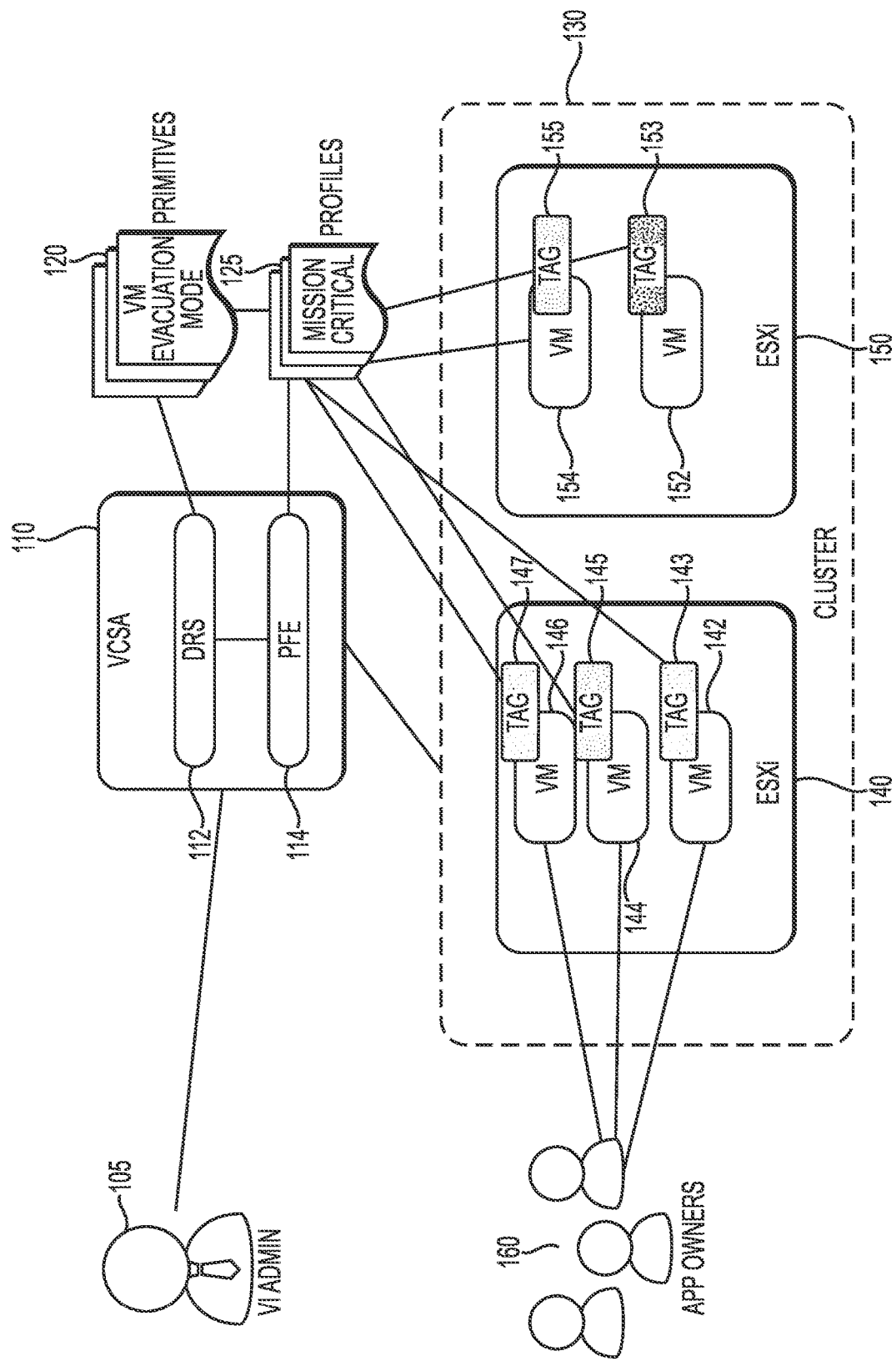
FIG. 1 is an illustration of example system components for profile-based workload scheduling.

FIG. 1 is an illustration of an example system for profile based QoS resource scheduling. A server appliance ("VCSA") 110 can execute as a centralized platform for managing virtual infrastructure in a cloud-based environment, such as an SDDC. The VCSA 110 can be software running on physical hardware, such as a server with a processor. The VCSA 110 can manage virtual components such as the hosts and VMs of the SDDC.

In the example of FIG. 1, the VCSA 110 has management responsibility for two hosts 140, 150. The first host 140 contains three workloads, represented by VMs 142, 144, 146. The second host 150 contains two workloads, represented by VMs 152, 154. These hosts 140, 150 are part of the same cluster 130. Although VMs are pictured, workloads can include VMs, virtual network functions ("VNFs"), and other virtual components. The workloads can perform various tasks in the network. For example, workloads can handle VoIP calls, perform virtualized routing, and interact with internet-of-things ("IoT") devices and their respective back-end systems, among other things. End users 160 can connect to the network and to the various VMs 142, 144, 146, depending on which VMs 142, 144, 146 correspond to particular end user applications. For example, a first VM 142 could be for streaming video whereas a second VM 144 could be for VoW calls.

Hosts 140, 150 can be physical or virtual and act as servers upon which workloads execute. Numerous hosts 140, 150 can belong to a cluster 130. The size of the cluster 130 and number of hosts can depend on the numbers of required workloads. The VCSA can ultimately be responsible for allowing the cluster 130 to scale out by adding hosts or scale in by removing hosts. Hosts can execute on physical servers that include a processor and memory storage, such as a non-transitory, computer-readable medium.

Based on scale changes or load balancing, the VCSA 110 may need to reassign workloads to new hosts. To handle these tasks, the VCSA 110 can include a DRS (distributed resource scheduler) 112. The DRS 112 can be responsible for placing workloads on hosts, reserving resources for workloads at the host, determining when to scale in or out, and moving workloads to different hosts. In one example, the DRS 112 can include or be an elastic DRS (also called EDRS) for scaling the cluster 130 in or out. This can include adding or removing a host, respectively, to the cluster 130. EDRS is discussed throughout the disclosure, but the same concepts can also apply to distributed power management ("DPM"), which can be another component of DRS 112. DPM maintains the demand-to-capacity ratio in the cluster in an example, such as by moving excess capacity into a standby state. As will be discussed, both DPM and EDRS can weight demand based on profile 125 categories to determine when to scale.

Unlike prior systems, the VCSA 110 can enforce a QoS framework at the DRS 112 level. To do this, the VCSA 110 can assign profiles 125 to workloads. The profiles 125 can represent QoS categories and define how the DRS 112 will treat the workloads during placement, load balancing, host maintenance, and other scenarios. The profiles 125 can also be used with EDRS and DPM in determining how to scale a cluster.

Turning first to the DRS 112 management of workloads, each workload can be assigned a profile that includes a set of scheduling primitives 120. Scheduling primitives 120 can provide the DRS 112 with information on how to treat the respective workloads in these scenarios. In other words, the scheduling primitives 120 can be attributes used by the DRS 112 to make decisions during various workflows. The DRS 112 can have different workflows for different situations that arise in an SDDC, such as initial workload placement, load balancing of one or more hosts, or evacuating workloads when a host goes into maintenance mode. The profile can represent a set of primitives 120 that can then be linked to these DRS 112 workflows. DRS 112 algorithms can consider which primitives 120 are associated with a given workload during operations. This can allow the DRS 112 to provide specific QoS-based scheduling once a workload is associated with a profile 125 having a set of scheduling primitives 120.

Example scheduling primitives 120 can include memory reservation, computer CPU reservation, priority placement, evacuation rules, load balancing rules, and eviction rules. Based on the scheduling primitives 120 implemented by the profiles 125, the DRS 112 can treat mission-critical workloads differently than normal workloads based on QoS. For example, a high-QoS VNF for VoIP can remain at a host while a normal-QoS VM may be stopped or moved for load balancing purposes. The DRS 112 can also reserve proportionally more resources at a host for higher-QoS workloads, based on the associated profiles 125.

The profiles 125 can also be used by the DRS 112 for cluster-level operations. For example, the DRS 112 can use the profiles 125 to determine when to scale in or out the cluster 130. In one example, the DRS 112 can execute an EDRS procedure to determine whether to scale a cluster based on the total workload demand versus cluster capacity. The demand of individual workloads can be weighted based on profile QoS levels, with higher QoS correlating to higher demand weight. The total demand therefore can take the QoS of the profiles into account. The DRS 112 can recommend scaling when the scale-out threshold or scale-in threshold is exceeded. To scale out, a new host can be created and assigned to the cluster. Then, primitives 120 can allow the DRS 112 to determine the order with which to place workloads on the new host.

To define and assign profiles 125, the VCSA 110 can include a policy framework endpoint ("PFE") 114. The PFE 114 can be a software engine that runs as part of the SDDC or on a management server. The PFE 114 can provide a console that the administrative user 105 can use to define or assign the profiles 125. In one example, the console includes a GUI that allows the administrative user 105 to select a profile from multiple profiles 125 and assign the profile to individual or groups of workloads. For example, the GUI can present lists, groups, or types of workloads. The administrative user 105 can select one or more of those and select a profile to assign to those workloads.

When assigned a profile, the VCSA 110 can add a tag to the workload to identify the assigned profile. The tag can allow the DRS 112 to retrieve the associated profile and scheduling primitives 120. For example, the PFE 114 can store various profiles 125 and their respective scheduling primitives 120. When the DRS 112 needs to place or potentially move or kill a workload, the DRS 112 can read the tag and retrieve the profile and corresponding scheduling primitives 120 from the PFE 114, in an example.

In the example of FIG. 1, VMs 142, 144, 146, 152, 154 include tags 143, 145, 147, 153, 155, respectively. In this example, VM 142 and VM 146 can have tags 143, 147 that share the same identifier, indicating that they also share the same profile for QoS purposes. However, VM 144 can have a tag 145 with a different identifier. When the DRS 112 needs to load balance host 140 or initially place workloads on the host 140, these tags 143, 145, 147 can be used to retrieve profiles 125 that can indicate how to prioritize the VMs 142, 144, 146 with respect to one another.

Each of the elements of the system of FIG. 1 can be implemented in hardware, software, or a combination of hardware and software and are collectively configured to operate as an SDDC. Hosts can be virtual components of the SDDC as well, in an example.

Alternatively, a host can represent a physical device upon which other virtual components of the SDDC execute. Therefore, a host can exist in a physical or virtual layer of the SDDC, depending on the example. An agent, in turn, can run in either the physical or virtual layer of the SDDC, depending on the example.

In one example, the hosts 140, 150 are co-located in a physical facility that provides SDDC services and are communicatively interconnected using a local area network. In another example, the hosts 140, 150 can be located in different physical locations and communicatively interconnected using a wide area network such as the internet or a Telco network. The hosts 140, 150 and can be virtualized. Alternatively, hosts 140, 150 can represent physical hardware on which various VMs 142, 144, 146, 152, 154 can run.

The hardware portion of a host 140, 150 can include a processor and a memory. The memory can be implemented in various ways, such as in the form of one or more memory devices mounted upon a printed circuit board located in the host 140, 150 or in the form of a distributed architecture that can include cloud storage components. The processor can access the memory to execute instructions stored in the memory for implementing various operations of an SDDC node in the host computer 105.

Figure 2:
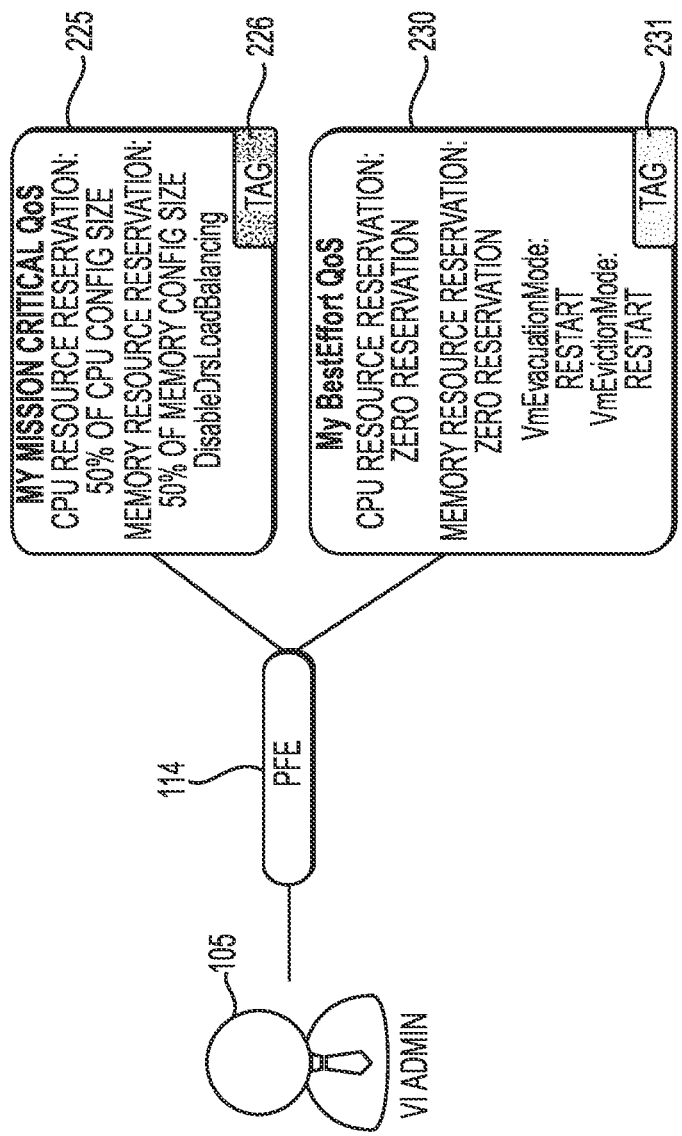
FIG. 2 is an illustration of example system components for profile-based workload scheduling.

FIG. 2 is an illustration of example components that can be used for implementing the system of FIG. 1. Specifically, the PFE 114 can allow the administrative user 105 to define or apply different profiles 225, 230 to the workloads. In this example, the two profiles 225, 230 represent different QoS categories. The first profile 225 is "mission critical" and the second profile 230 is "best effort." In other words, the first profile 225 is a higher-priority QoS category than the second profile 230. The profiles 225, 230 can be associated with different tags 226, 231. The tags 226, 231 can include an identifier used by a DRS 112 to retrieve the respective profile 225, 230. This can include retrieving scheduling primitives 120 that can inform the DRS 112 how to treat the particular workload.

In this example, the mission critical profile 225 includes a first scheduling primitive 120 for CPU resource reservation. The value assigned to that primitive 120 in the mission critical protocol 225 is "50% of CPU config size." This can add 50% to the amount of CPU specified for the workload in configuration information contained in the workload. Conversely, for the best efforts profile 230, the primitive 120 for CPU resource reservation is set to "zero reservation." Therefore, for a workload having a tag 226 (corresponding to the higher QoS first profile 225), the DRS 112 can reserve 50% more CPU than the CPU config size specified for the workload. However, for a second workload containing tag 231 (corresponding to the lower QoS second profile 230), the same primitive 120 causes the DRS 112 to make no additional CPU reservation.

In this example, the mission critical profile 225 also contains a second scheduling derivative for memory resource reservation. The second scheduling primitive 120 is set to "50% of memory config. size." Like the prior example, this can cause the DRS 112 to reserve 50% more memory at the host than specified by the configuration information of a workload having tag 226. In contrast, another workload with tag 231 corresponding to the second profile 230 will receive no additional memory beyond what is specified in the configuration information for that workload. That is because the second profile 230 includes a scheduling primitive 120 that specifies to reserve no additional memory at the host.

The mission critical profile 225 also has a scheduling primitive 120 "DisableDRSLoadBalancing." This can cause the DRS 112 of FIG. 1 to leave the corresponding workload operational on a first host during a load balancing operation. Instead, other lower-priority QoS workloads can be moved from the first host to different hosts to free up resources at the first host. In other words, the workloads with the mission critical profile 225 can continue to operate at the first host without disruption. The best efforts profile 230 of this example does not contain a similar scheduling primitive 120. Therefore, a workload assigned that profile 230 would be a candidate for movement off of the first host by the DRS 112 during load balancing.

The best efforts profile 230 includes evacuation mode and eviction mode scheduling primitives 120. Evacuation mode can be evoked during maintenance of a host. For example, if a host is entering maintenance mode, where it will temporarily cease operation, an evacuation mode value of "restart" can indicate that the DRS 112 should restart the workload when it is complete. Other values can, for example, call for the workload to be moved and not restarted on the same host. Evacuation mode will be discussed in more detail below with respect to FIG. 4.

Eviction mode can define how to evict a workload from a host that is overloaded and subject to load balancing, rather than migrating the workload away normally. In this example, the "restart" value can cause the DRS 112 to power off the workload and power it back on once the host is no longer over-utilized. Eviction mode is discussed in more detail below with regard to FIG. 4.

Figure 3:
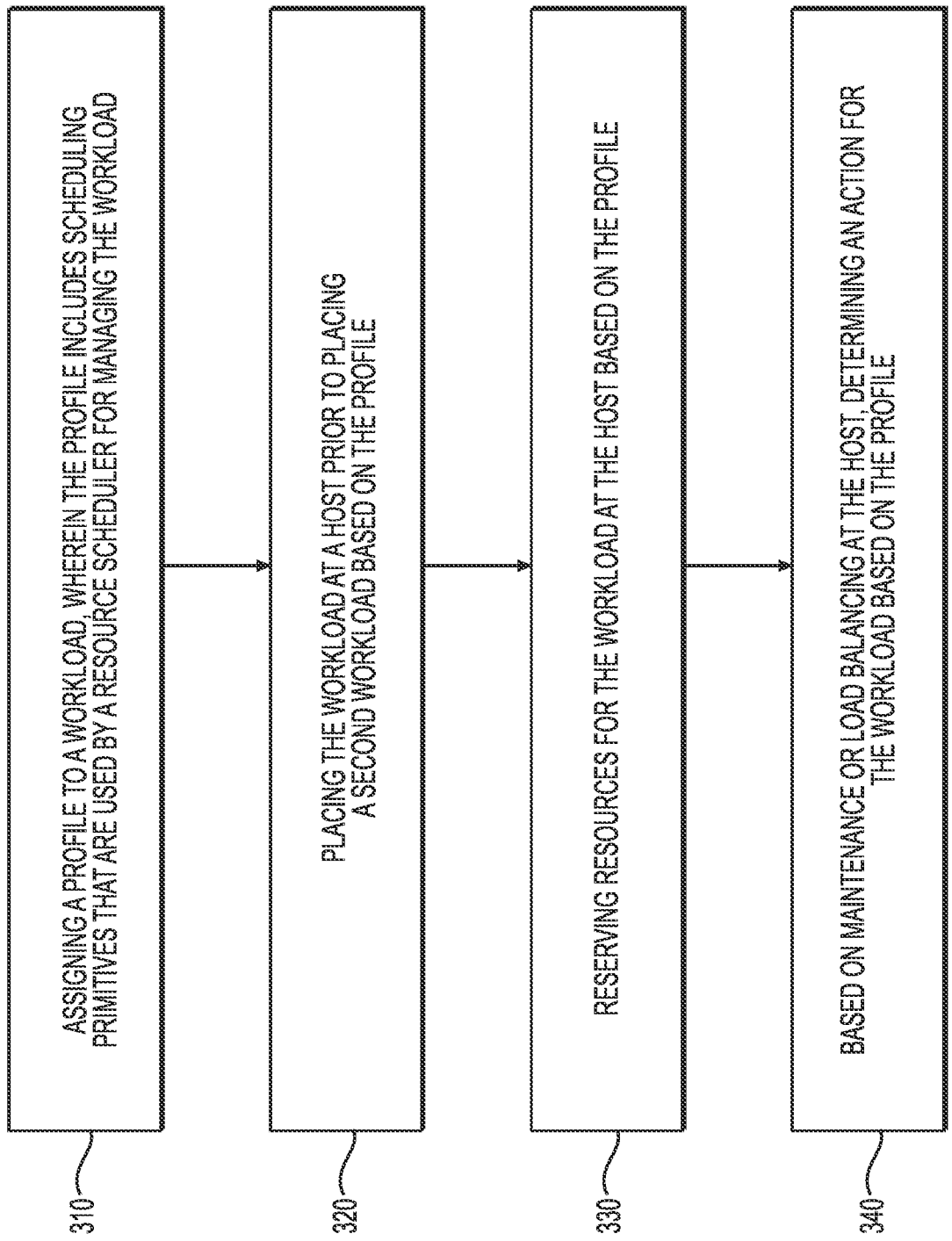
FIG. 3 is a flow chart with example stages for profile-based workload scheduling.

FIG. 3 is an example method for using profiles to enforce QoS for workloads at the resource scheduling level. At stage 310, an administrative user 105 can use a console to assign a profile to a workload. The console can include a GUI that allows the administrative user to select one or more workloads and select a profile that will apply to those workloads. In one example, the console provides an option to group workloads and assign a profile to the entire group. This can cause the workloads to contain the corresponding tag, which can be used by the DRS 112 to identify the profile. The profile can include scheduling primitives 120 used by the DRS 112 to reserve host resources and prioritize workload placement and movement.

At stage 320, based on assigned profiles, the DRS 112 can place the workload at a host prior to placing a second workload. This can occur, for example, if the profile of the workload has a higher priority placement value than a second profile assigned to the second workload. This can ensure higher QoS workloads are placed on a host prior to lower QoS workloads. This can be especially important when resources at the host can run out prior to placement of all the workloads.

At stage 330, the DRS 112 can reserve resources at the host for the workload. The reservation can be based on the profile assigned to the workload. For example, a first scheduling primitive 120 in the profile can indicate how much additional CPU resources to assign to the workload and a second scheduling primitive 120 can indicate how much additional memory resources to assign to the workload. The workload itself can have configuration information indicating how much CPU and memory are required. The DRS 112 can reserve the amount of CPU and memory indicated in the configuration as a floor, in one example. However, the first and second scheduling derivatives can indicate that an additional percentage of either CPU or memory needs to be reserved. For example, a higher QoS profile can reserve a greater percentage than a lower QoS profile.

At stage 340, the DRS 112 can use the profile to determine an action for the workload in response to maintenance or load balancing of the host. For example, the profile can include a scheduling primitive that prioritizes movement of the workload, prevents movement, or instructs to restart the workload, among others. These primitives 120 can be specific to evacuation mode, eviction mode, or disabling movement during load balancing, in an example. Therefore, the action can be to leave the workload in place at the host, kill and restart the workload, or move the workload to another host, among other actions.

Figure 4:
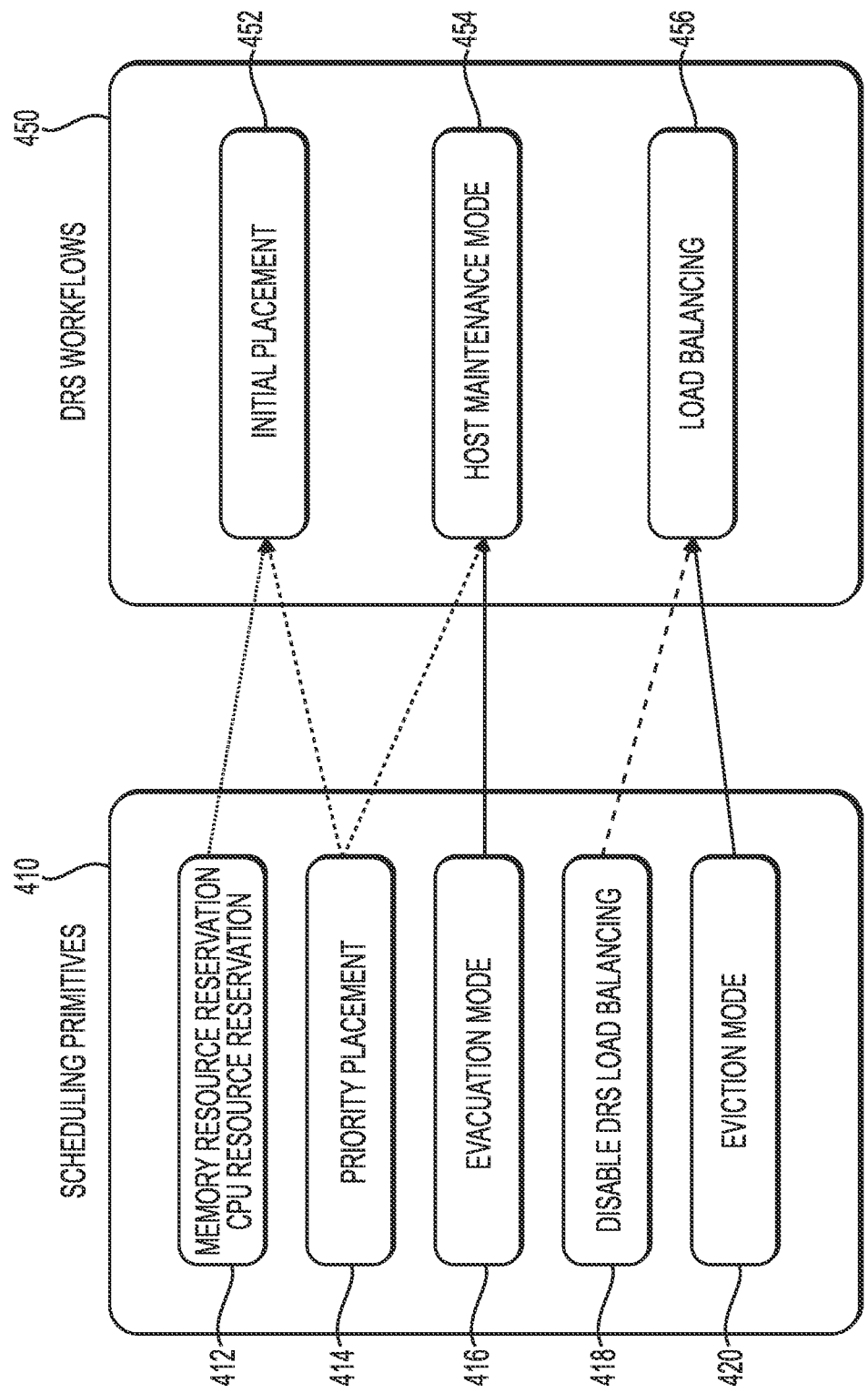
FIG. 4 is an illustration of an example relationships between scheduling primitives and DRS workflows.

FIG. 4 is an example illustration of scheduling primitives 410 and their correlations to DRS workflows 450. Resource reservation primitives 412 can allow the DRS 112 to schedule additional resources for a workload with above-normal QoS. These primitives 412 can be specific to CPU resources or memory resources. In one example, the resource primitive 412 will indicate an additional percentage of resources to reserve. The workload itself can include configuration information that the DRS 112 normally uses to schedule resources. However, based on the profile and the corresponding resource primitive 412, the DRS 112 can add the indicated percentage to the resources identified in the configuration information.

The DRS 112 can use the resource primitives 412 during initial placement of the workload. The initial placement workflow 452 can be triggered the first time the workload is instantiated at a host. In one example, moving the workload to another host also triggers the initial placement workflow 452. The initial placement workflow 452 can take other scheduling primitives 410 into account as well.

In one example, a priority placement primitive 414 can include a value that allows the DRS 112 to prioritize placement of the workload. The administrative user 105 can set the priority placement primitive 414 to place some workloads prior to others. This can help preserve resources at the host or cluster for workloads with higher QoS priority. If the cluster does not have capacity to accommodate all incoming workloads, the priority placement primitive 414 can help ensure that workloads with lower priority will not be placed until after workloads with higher priority. In one example, the priority placement primitive 414 includes a value for ranking for placing the workloads. Workloads with lower priority are placed after the higher-priority workloads. In this way, the DRS 112 can order placement of the workloads at a host based on QoS.

In one example, every workload has a default value of 0 for priority placement. If the administrative user 105 wants to place some workloads or types of workloads prior to other workloads, they can select a profile with a priority placement primitive 414 having a value above 0.

In one example, the priority placement primitive 414 applies to group power-on of several workloads during initial placement 452. But the priority placement primitive 414 can also apply when a group of workloads should be evacuated from the host as part of the host maintenance workflow 454. When a host is put into maintenance mode, by default the workloads can be migrated away from the host. However, the migration can be prioritized based on the priority placement primitive 414. This can include migrating the higher-priority workloads prior to the lower-priority workloads. Additionally, at the new host, the priority placement primitive 414 can again be used as part of the initial placement workflow 452, in an example.

The DRS 112 can also use an evacuation mode primitive 416 during a host maintenance mode workflow 454. The evacuation mode primitive 416 can describe a desired state for a workload when the host that it is running on is put into maintenance mode. If the administrative user 105 wants the DRS 112 to do something other than move the workload, for example, this can be defined by the evacuation mode primitive 416. A different action can be identified by the evacuation mode primitive 416. As another example of an action, the DRS 112 can power off the workload when the host is put into maintenance mode. As another example action, the DRS 112 can suspend the workload into memory and resume the workload once the host exits maintenance mode. Alternatively, the evacuation mode primitive 416 can cause the DRS 112 to suspend the workload into disk when the host is put into maintenance mode. Later, the DRS 112 can resume the workload when the host exits maintenance mode. As still another alternative, the evacuation mode primitive 414 can cause the DRS 112 to restart the workload. This can include powering off the workload when the host enters maintenance mode and powering the workload back on when the host exits maintenance mode.

Additional scheduling primitives 410 can apply when the DRS 112 attempts a load balancing workflow 456. For example, the profile can include a disable DRS primitive 418 that can cause the DRS 112 to not move the workload as part of load balancing. This primitive 418 can be used so that administrators do not need to manually disable DRS 112 on individual workloads in order to prevent workload movement during load balancing. Instead, the disable DRS primitive 418 can override DRS 112 behavior during a load balancing workflow 456. If a workload is associated with the disable DRS primitive 418, the DRS 112 can prevent migration of that workload during load balancing when the DRS 112 rules would otherwise promote migration of the workflow. The DRS 112 can still apply other rules in an example. For example, affinity and anti-affinity policies can be enforced on a workload even if the workload is associated with the disable DRS primitive 418, in an example. This can present functional advantages over simply disabling DRS 112 entirely for a workload.

Additionally, the profile can include an eviction mode primitive 420. This primitive 420 can define how to evict a workload if the current host the workload runs on becomes over-utilized. A host can become over-utilized if the combined resource demand at the host is higher than the host capacity. Typically, the DRS 112 can respond by load balancing and migrating workloads away from the host to resolve resource contention. But the eviction mode primitive 420 can be used to provide different QoS-specific actions based on a profile assigned to a workload. The eviction mode primitive 420 can differ from the evacuation mode primitive 416 because it can help the DRS 112 solve resource contention at the host rather than decisions in the host maintenance mode workflow 454. The actions taken based on the eviction mode primitive 420 can result in releasing host resources. Different values of the eviction mode primitive 420 can reflect different desired actions.

As one example action, the DRS 112 can power off a workload when the host is over-utilized. Alternatively, eviction mode primitive 420 can cause the DRS 112 to suspend the workload into disk during over-utilization and resume the workload when the host is under-utilized. Another example action is to restart the workload. The DRS 112 can power off the workload when the host is over-utilized and power the workload back on when utilization allows.

Profiles can be built for different QoS levels by implementing one or more of these scheduling primitives 410. As an example, profiles representing three different QoS categories are listed in Table 1 below:

TABLE 1

| Workload Profile | Scheduling Primitives |
|---|---|
| Mission Critical | CPU Resource Reservation: Full |
| | Memory Resource Reservation: Full |
| | Disable DRS Load Balancing |
| | Placement Priority: Highest |
| Normal | CPU Resource Reservation: VM Config. |
| | Memory Resource Reservation: VM Config. |
| Best Efforts | CPU Resource Reservation: Zero |
| | Memory Resource Reservation: Zero |
| | Evacuation Mode: Suspend into mem./resume |
| | Eviction Mode: Restart |
| | Priority Placement: Lowest |

Three workload profiles are presented in Table 1, each implementing different scheduling primitives 410. These profiles can be created by an administrative user 105 using a console GUI, in an example. Alternatively, they can be pre-existing and selected for assignment to one or more workloads by the administrative user 105. These profiles are exemplary. Any number of profiles can be created and used, in an example.

For the mission critical profile of Table 1, four scheduling primitives 410 are implemented. The first, CPU Resource Reservation, can be a type of resource reservation primitive 412. In this example, the value is "Full." This can cause the DRS 112 to reserve at the host a full amount of CPU resources, which can be mathematically determined based on configuration defaults for the workload. Similarly, the mission critical profile includes a resource reservation primitive 412 for Memory Resource Reservation, again set to "Full." This can cause the DRS 112 to reserve at the host a full amount of memory resources. The mission critical profile can also contain a disable DRS primitive 418 and a priority placement primitive 414 with "Highest" as the value. This can cause the DRS 112 to avoid moving the associated workload while load balancing. Additionally, the workload can be prioritized for placement or movement above other workloads that do not have the "highest" priority placement primitive 414.

Continuing with Table 1, the normal workload profile can extend two resource reservation primitives 412, in this example. These specify that the DRS 112 should reserve CPU and memory based on the "VM Config," which can be configuration information found in the metadata of the VM (one type of workload), in an example. This can be a normal level of resource reservation. However, the third profile of Table 1, "best efforts," can specify reserving fewer than the configuration information indicates. In this example, no resources at all are reserved. The best efforts profile also extends primitives 410 for evacuation mode 416, eviction mode 420, and priority placement 414. The priority placement value of "lowest" can cause the DRS 112 to prioritize placement of the workload behind even default placement values, such as those of workloads with the normal profile. In this example, the normal profile does not extend the priority placement primitive 414, and the priority placement can default to a 0 value. The "lowest" value can be prioritized even below zero, in an example.

Profile-based resource reservation can also be tied to scale in and scale out of the cluster. In one example, the DRS 112 can implement EDRS and determine whether to scale a cluster in either direction based on QoS profiles for the workloads. One such example of an EDRS algorithm is presented in the pseudocode of Table 2, below:

TABLE 2

Example EDRS algorithm

```
procedure EDRS(Workloads W, Cluster C)
    total ← 0
    for each w ∈ W do // Iterate each workload
        if w is mission critical workload then
            total += Avg(w.demand) + 2*StdDev(w.demand)
        else if w is best effort workload then
            total += Avg(w.demand)
        else // Normal workload
            total += Avg(w.demand) + StdDev(w.demand)
        end if
    end for
    if total/C.capacity > scale-out threshold then
        Raise scale-out recommendation
    else if total/C.capacity < scale-in threshold then
        Raise scale-in recommendation
    end if
end procedure
```

To determine whether to scale in or out, the EDRS algorithm can iteratively add up the resources needed by all the workloads on a host or in a cluster. For each workload, the resource reservation can be based on the profile classification. For example, a mission critical profile can add to the average demand of the workload. In the example of Table 2, the algorithm can add two times the standard deviation of the workload's demand to the average demand. The normal profile can cause the DRS 112 to add only one standard deviation to the average demand, while the best efforts profile can add just the average demand.

The total can then be divided by the capacity of the cluster and compared against scale out and scale in thresholds. If the result is above the scale out threshold, then the DRS 112 can recommend scale out. A separate process, such as an orchestrator, can perform scale out by, for example, adding hosts to the cluster. Conversely, if the result is below the scale in threshold, then the DRS 112 can recommend scale in. Scale in can eliminate one or more hosts from the cluster, in an example.

Figure 5:
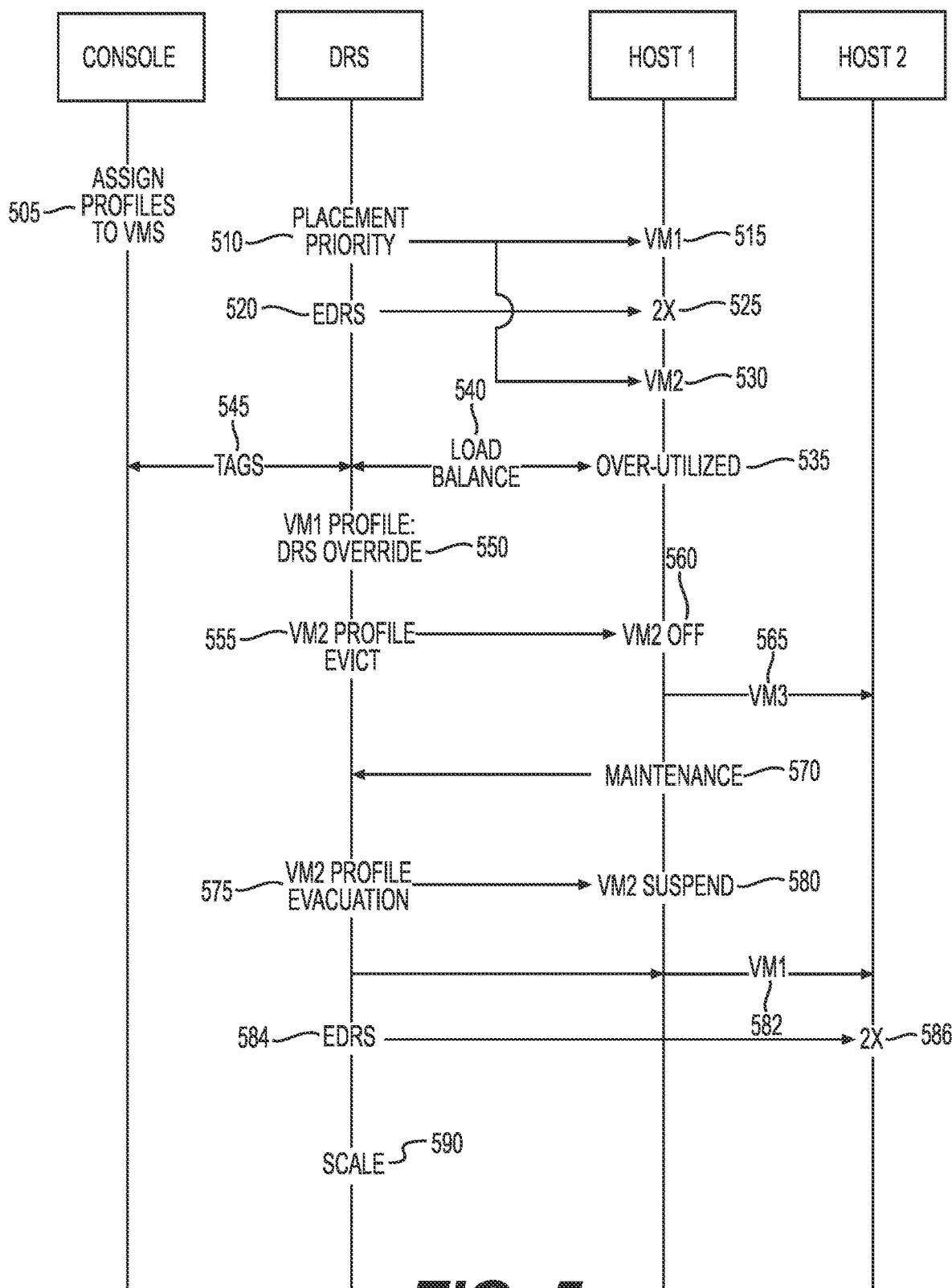
FIG. 5 is a sequence diagram with example stages for profile-based workload scheduling.

FIG. 5 is a sequence diagram of example stages performed by a system for profile-based QoS enforcement for workloads. At stage 505, an administrative user 105 can use a console to assign profiles to VMs (one type of workload). This can include using a GUI to identify one or more groups of VMs and selecting an existing profile to assign to those VMs. In one example, the GUI ranks the profiles in relation to QoS classification. This can allow the administrative user 105 to assign the profiles without having to know every nuance of which scheduling primitives 410 and primitive values are implemented by each profile. The GUI can also allow the user 105 to create profiles, in an example. The user can select which scheduling primitives to implement, and what values to assign to those profiles.

At stage 510, the DRS 112 can place multiple workloads at a first host. To do so, the DRS 112 can retrieve profiles for the VMs to determine placement priority. In one example, each VM includes a tag that the DRS can use to retrieve the corresponding profile. The tag can be part of metadata or configuration information for the VM. In this example, the tag of a first VM references a priority placement primitive 414 that is ranked ahead of a priority placement primitive 414 of a second VM. The tag can reference the priority placement primitive 414 directly or indirectly, such as by referencing a profile that then references the priority placement primitive 414. Based on the first VM having a higher priority placement than the second VM, the DRS 112 can place the first VM on the host at stage 515 and the second VM on the host at stage 530. This can help ensure that the first VM, with its higher QoS, is placed relatively earlier than other VMs, before resources run out at the first host.

In placing the VMs, the DRS 112 can elastically schedule resources at stage 520. This can include determining how much resources to schedule for VMs based on their respective profiles. Resource reservation primitives 412 can allow the DRS 112 to reserve CPU and memory that is greater than, equal to, or less than amounts specified in the configuration information of a respective VM. For example, the primitive 412 can indicate a multiplier to apply to the resources identified in the configuration information, increasing with higher QoS categories, or zero for the lowest QoS category. In this example, at stage 525, based on the profile for the first VM, the DRS 112 reserves two times the amount of resources specified by the configuration information of the first VM.

In one example, at stage 520, EDRS can also be applied globally to the host or cluster to determine when a new host is needed. As described earlier with regard to Table 2, the DRS 112 can estimate cluster usage based on the QoS levels of the profiles of the workloads and recommend scale out or scale in based on threshold usage levels.

In one example, at stage 545, the DRS 112 receives profiles from a server associated with the console, such as a management server, based on the tags identified in the VMs that the DRS 112 is managing. The tags can be identifiers used to look up the profile, which can be stored in one or more tables or records on a non-transitory, computer-readable medium. In one example, the tags are used to look up scheduling primitives 410, more than one of which can be assigned to a single tag. The collection of scheduling primitives 410 can comprise a profile, in an example. In another example, a profile is separately identified from the tag, and then the scheduling primitives 410 are identified from the profile.

At stage 535, the DRS 112 can detect that the first host is over-utilized. This can be reported from the first host or simply determined by the DRS 112, which can calculate resource reservation at the host based on the VMs' profiles and compare that to the host capacity. As a result, the DRS 112 can perform load balancing at stage 540. This can include moving one or more VMs to another host as a default. However, the DRS 112 can also utilize scheduling primitives such as disable DRS load balancing 418 and eviction mode 420 in determining which VMs to move and what other possible actions to take.

At stage 550, the DRS 112 can decline to move the first VM because it is associated with the disable DRS primitive 418. This can override the normal rules of the DRS 112 and leave the first VM running at the host. The DRS 112 can then look for other VMs to act on in order to relieve the resource congestion at the first host. For example, at stage 555, the DRS 112 can evict the second VM based on the second VM being associated with an eviction mode primitive 420. In this example, the eviction mode primitive 420 is set to "power off," which can cause the DRS 112 to tell the first host to turn off the second VM at stage 560. Depending on the profile, the second VM can be powered back on later when resources at the first host allow. For example, when the first host falls below a threshold utilization, powered-off VMs can be powered back on by the DRS 112. The sequence for powering on the VMs can be determined by a priority placement primitive 414, in an example.

A third VM can have a profile that does not implement a primitive for disabling DRS. As a result, the DRS 112 can move the third VM from the first host to a second host at stage 565.

At stage 570, the first host can enter maintenance mode. This can occur, for example, when maintenance operations need to occur at the host due to performance issues or for regularly scheduled maintenance. The DRS 112 can respond by evacuating VMs or taking other actions specified by profiles. For example, at stage 575 the DRS 112 can retrieve the profile for the second VM, which can include retrieving an evacuation mode primitive 416. The evacuation mode primitive 416 of the second VM can be set to "suspend." This can cause the DRS 112 to suspend the second VM into memory or disk (depending on the primitive value) while the first host is in maintenance mode. When the first host comes out of maintenance mode, the second VM can resume operation.

Conversely, the high-QoS profile of the first VM can cause the DRS 112 to move the first VM to the second host at stage 582. The DRS 112 can reserve resources at stage 586 based on the profile of the first VM. In this case, that results in reserving twice the resources specified in the configuration information of the first VM, as was discussed for stage 525. This can be done as part of EDRS at stage 584.

In one example, EDRS at stage 584 includes determining whether scale out or scale in is needed. This can be triggered based on an event, such as a new VM placement or the first host going into maintenance mode. The DRS 112 can determine the total demand of the workloads in the cluster, such as the first, second, and third VMs. The demand can be based on profiles, such that higher-QoS profiles increasingly cause the DRS 112 to calculate extra demand for a VM. In other words, CPU or memory demand can be overestimated for workloads with high QoS profiles. The scaled demand of each workload can be summed, such as discussed with regard to the EDRS algorithm of Table 2. The DRS 112 or some other management process, such as at an orchestrator, can compare the total demand against the capacity of the cluster to determine whether to scale the cluster. Based on these comparisons, the DRS 112 can recommend a scale out or scale in operation at stage 590. In one example, the recommendation is sent to an orchestrator, console, or management server.

In current systems that do not utilize workload-specific profiles for QoS, demand overestimation may be broadly applied to all VMs. But by using profiles to enforce QoS, the system can estimate demand differently for different workload profiles. In one example, standard deviation can be excluded from the demand calculation for normal VMs. This can allow EDRS to add capacity less aggressively than current systems and remove capacity more aggressively. This can improve server utilization in clusters and provide significant cost savings.

Figure 6:
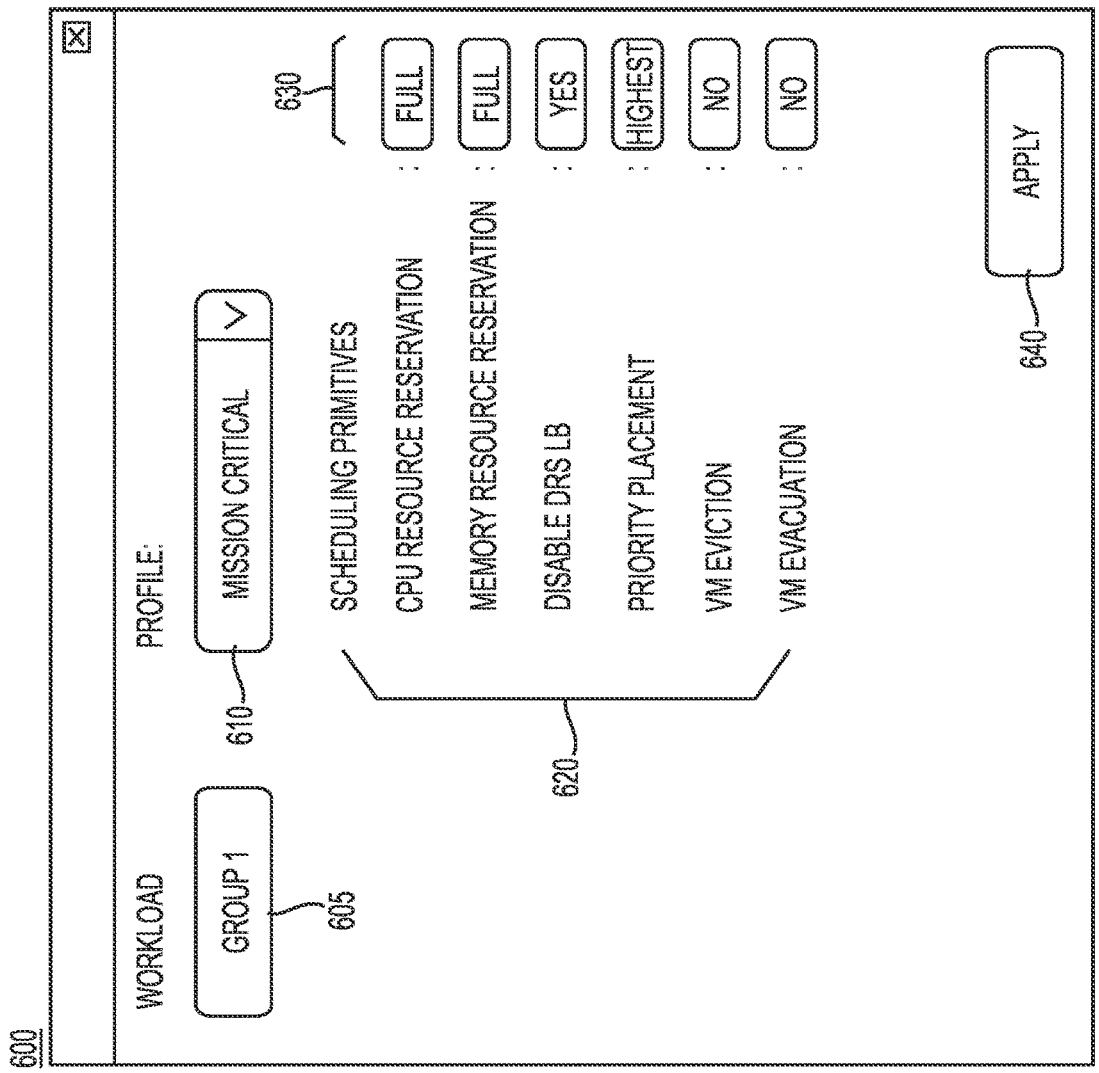
FIG. 6 is an illustration of an example GUI for editing and assigning profiles to workloads.

FIG. 6 is an example illustration of a GUI 600 for assigning profiles to workloads. In this example, an administrative user 105 can select one or more workloads, such as by selecting a group 605. The group can be based on the type of application to which the workload pertains, the customer that the workload serves, or some other criteria.

The GUI 600 can provide a selection mechanism 610 for choosing a profile. In this example, a drop-down list is used and the administrative user 105 has selected the mission critical profile. The scheduling primitives 620 of the selected profile (or possible scheduling primitives) can display on the GUI 600. Additionally, the current value 630 assigned to each scheduling primitive can display. In one example, the GUI 600 allows the administrative user 105 to change the values 630. In this way, custom profiles can be created that have a custom combination of scheduling primitives 620, in an example. The user 105 can apply the edits using the Apply button 640.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather, any feature of any example described here can be incorporated into any other suitable example. It is intended that the specification and examples be considered as exemplary only, with a true scope and spirit of the disclosure being indicated by the following claims.

What is claimed is:

1. A method for profile-based workload scheduling, comprising:
retrieving a profile for a workload, wherein the profile includes tags that a dynamic resource scheduler links to scheduling primitives for managing the workload;
prioritizing placement of the workload at a host relative to a second workload based on the profile;
reserving resources for the workload at the host based on the profile, wherein resource reservation is prioritized for the workload relative to the second workload based on the profile; and
taking an action on the workload based on the scheduling primitives during load balancing and a maintenance mode at the host, wherein taking the action on the workload during the load balancing at the host includes leaving the workload running at the host based on a scheduling primitive that disables migrating the workload during load balancing, wherein the dynamic resource scheduler instead moves the second workload to a second host.

2. The method of claim 1, wherein the profile is assigned by selecting, on a graphical user interface, the profile from a plurality of profiles having different quality of service classifications, wherein the different profiles correspond to different sets of scheduling primitives.

3. The method of claim 2, wherein a first profile causes more processing resources to be reserved than a second profile, and the second profile causes more processing resources to be reserved than a third profile.

4. The method of claim 1, further comprising assigning a tag to the workload, wherein the dynamic resource scheduler uses the tag to retrieve a placement priority primitive as part of the prioritized placement of the workload at the host.

5. The method of claim 1, wherein taking the action during the maintenance mode of the host is based on an evacuation mode scheduling primitive of the profile.

6. The method of claim 1, further comprising:
calculating a total demand based on individual demands of multiple workloads in a cluster, wherein at least some individual demands are overestimated based on respective profiles for those workloads;
determining whether to scale the cluster based on the total demand and cluster capacity;
and scaling the cluster based on the determination.

7. A non-transitory, computer-readable medium containing instructions for profile-based workload scheduling, the instructions causing a processor to perform stages comprising:
assigning tags to a workload, wherein a dynamic resource scheduler links the tags to scheduling primitives for managing the workload, the linked scheduling primitives comprising a profile;
prioritizing placement of the workload at a host relative to a second workload based on the linked scheduling primitives;
reserving resources for the workload at the host based on the linked scheduling primitives, including reserving less resources for the workload than for the second workload, wherein the second workload has a second profile with a different tag than in the profile of the workload; and
taking an action on the workload based on at least one of the scheduling primitives during at least one of load balancing and a maintenance mode at the host, wherein taking the action on the workload during the load balancing at the host includes leaving the workload running at the host based on a scheduling primitive that disables migrating the workload during load balancing, wherein the dynamic resource scheduler instead moves the second workload to a second host.

8. The non-transitory, computer-readable medium of claim 7, wherein the profile is assigned by selecting, on a graphical user interface, the profile from a plurality of profiles having different quality of service classifications, wherein the different profiles correspond to different sets of scheduling primitives.

9. The non-transitory, computer-readable medium of claim 8, wherein a first profile causes more processing resources to be reserved than a second profile, and the second profile causes more processing resources to be reserved than a third profile.

10. The non-transitory, computer-readable medium of claim 7, the stages further comprising assigning a first tag to the profile, wherein the dynamic resource scheduler uses the first tag to retrieve a placement priority primitive as part of the prioritized placement of the workload at the host.

11. The non-transitory, computer-readable medium of claim 7, wherein taking the action during the maintenance mode of the host is based on an evacuation mode scheduling primitive of the profile.

12. The non-transitory, computer-readable medium of claim 7, the stages further comprising:
calculating a total demand based on individual demands of multiple workloads in a cluster, wherein at least some individual demands are overestimated based on respective profiles for those workloads;
determining whether to scale the cluster based on the total demand and cluster capacity;
and scaling the cluster based on the determination.

13. A system for profile-based workload scheduling, comprising:
a memory storage including a non-transitory, computer-readable medium comprising instructions; and
a computing device including a hardware-based processor that executes the instructions to carry out stages comprising:
assigning tags to a workload, wherein the tags are linked to scheduling primitives, and wherein a dynamic resource scheduler uses the scheduling primitives for managing the workload;
prioritizing placement of the workload at a host relative to a second workload based on the scheduling primitives;
reserving resources for the workload at the host based on the scheduling primitives; and
taking an action on the workload based on a first scheduling primitive retrieved using a first tag of the assigned tags, wherein the action includes a migration decision for the workload based on the scheduling primitive, wherein taking the action on the workload during the load balancing at the host includes leaving the workload running at the host based on a scheduling primitive that disables migrating the workload during load balancing, wherein the dynamic resource scheduler instead moves the second workload to a second host.

14. The system of claim 13, wherein the tags are associated with a profile, and wherein the tags are assigned to the workload by selecting, on a graphical user interface, the profile from a plurality of profiles having different quality of service classifications, wherein the different profiles correspond to different sets of scheduling primitives.

15. The system of claim 14, wherein a first profile causes more processing resources to be reserved than a second profile, and the second profile causes more processing resources to be reserved than a third profile.

16. The system of claim 13, wherein the dynamic resource scheduler uses the first tag to retrieve a first placement priority primitive as part of the prioritized placement of the workload at the host.

17. The system of claim 13, wherein the migration decision occurs during at least one of load balancing and a maintenance mode at the host, and wherein the migration decision includes leaving the workload running at the host.

18. The system of claim 13, the stages further comprising:
calculating a total demand based on individual demands of multiple workloads in a cluster, wherein at least some individual demands are overestimated based on respective linked scheduling primitives for those workloads;
determining whether to scale the cluster based on the total demand and cluster capacity;
and scaling the cluster based on the determination.

19. The system of claim 13, the stages further comprising:
assigning a tag to the workload, wherein the dynamic resource scheduler uses the tag to retrieve a placement priority primitive as part of the prioritized placement of the workload at the host.

* * * * *